P. LATTA.
SHUTTER ADJUSTER MECHANISM FOR VEHICLE LAMPS.
APPLICATION FILED SEPT. 28, 1914.

1,199,578.

Patented Sept. 26, 1916.
2 SHEETS—SHEET 1.

WITNESSES:
C. A. Ellis
R. C. Bruckner

INVENTOR
P. Latta
By John W. Spellman
ATTORNEY

P. LATTA.
SHUTTER ADJUSTER MECHANISM FOR VEHICLE LAMPS.
APPLICATION FILED SEPT. 28, 1914.
1,199,578.
Patented Sept. 26, 1916.
2 SHEETS—SHEET 2.
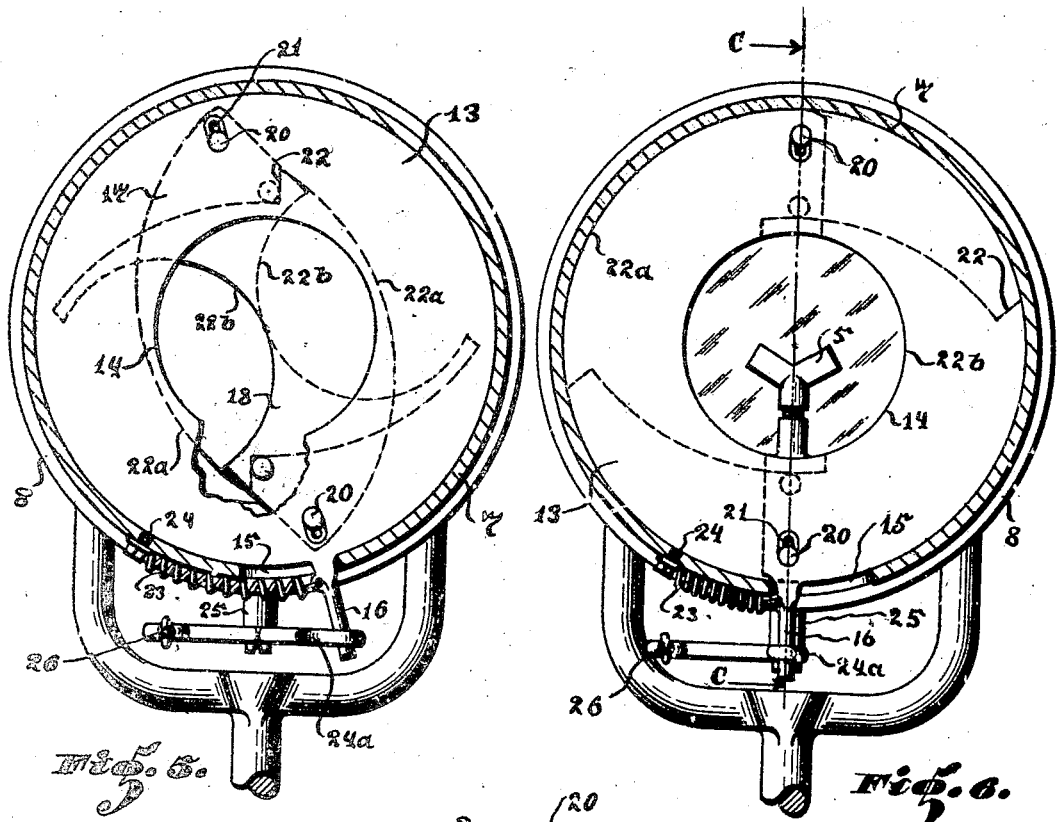
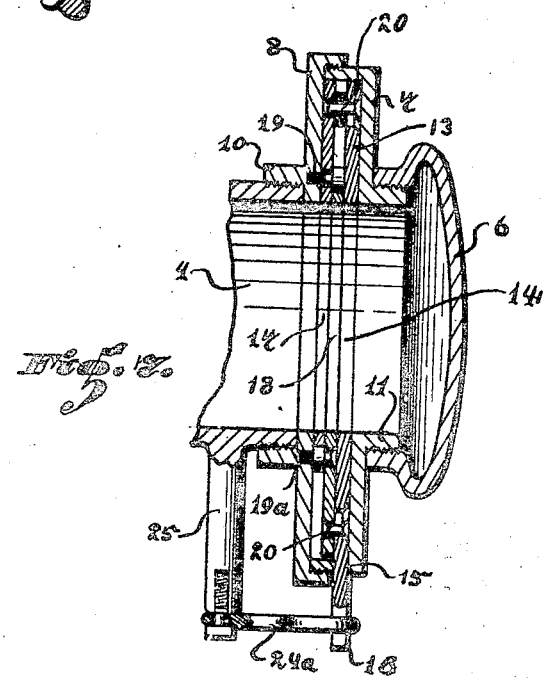
WITNESSES:
INVENTOR
*P. Latta*
ATTORNEY

UNITED STATES PATENT OFFICE.

PAUL LATTA, OF DALLAS, TEXAS.

SHUTTER-ADJUSTING MECHANISM FOR VEHICLE-LAMPS.

1,199,578.     Specification of Letters Patent.     Patented Sept. 26, 1916.

Application filed September 28, 1914. Serial No. 863,795.

*To all whom it may concern:*

Be it known that I, PAUL LATTA, a citizen of the United States, residing at Dallas, in the county of Dallas and State of Texas, have invented certain new and useful Improvements in Shutter-Adjusting Mechanism for Vehicle-Lamps, of which the following is a specification.

My invention relates to an improved means for dimming the lights of an automobile or other vehicle and it has for its main object the interposition between the source of light and the reflector for the lamp of a shutter of relatively simple construction so arranged that it may readily be operated manually by the driver of the vehicle.

Figure 1:
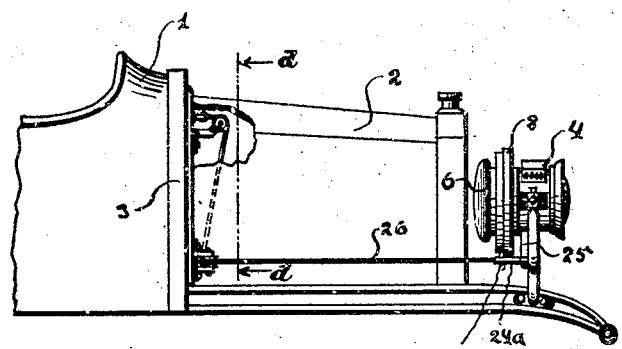
Figure 3:
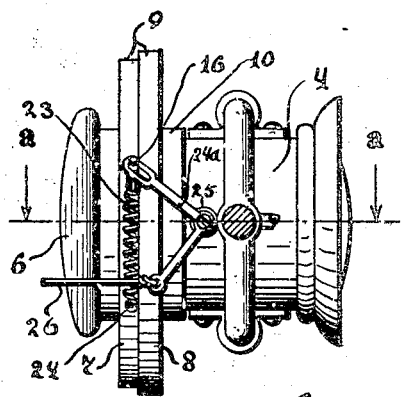
Figure 2:
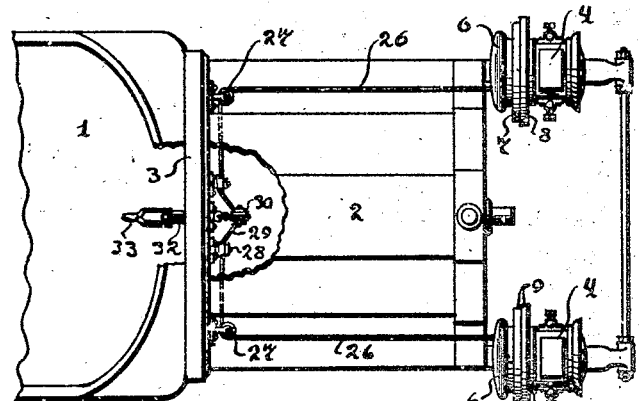
Figure 4:
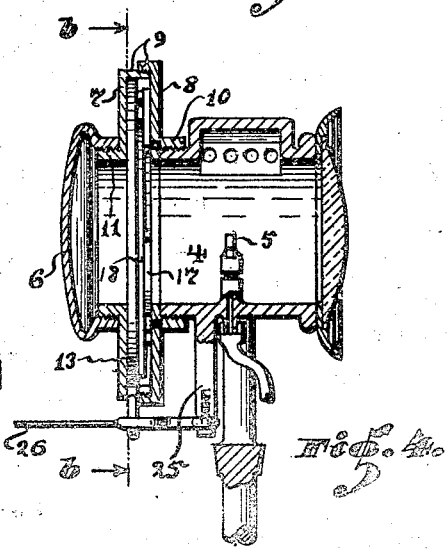
Figure 5:
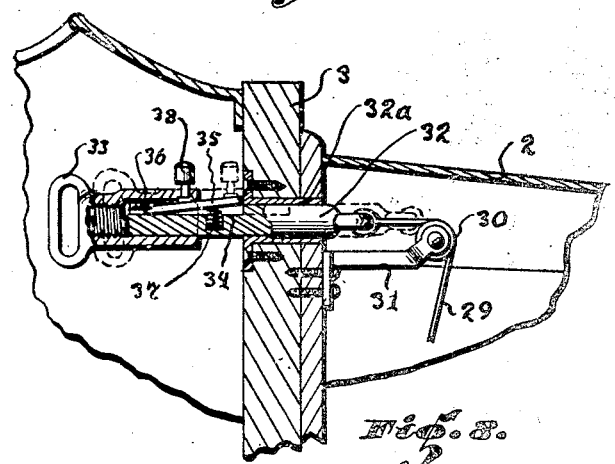
Figure 6:
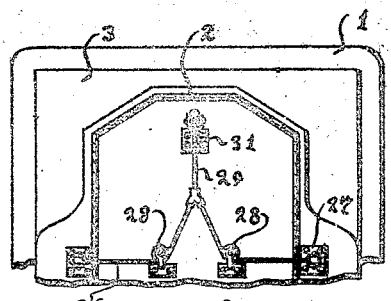

With the above and various other objects in view, my invention has relation to certain novel features of the construction and use, an example of which is described in the following specification, and is illustrated in the accompanying drawing, wherein:

Figure 1 is a view showing in side elevation the front portion of an automobile, which is equipped with my adjusting mechanism to control shutters within the lamp. Fig. 2 is a plan view of the same. Fig. 3 is a bottom view of one of the lamps. Fig. 4 is a vertical sectional view of one of the lamps, the section being taken on *a—a* of Fig. 3. Fig. 5 is an enlarged detail sectional view of one of the lamps, the section being taken on *b—b* of Fig. 4, the two-part shutter being shown in its closed position. Fig. 6 is a similar view in which the two-part shutter is shown open or in its normal position. Fig. 7 is a fragmentary detail sectional view of the lamp, the section being taken on the line *c—c* of Fig. 6. Fig. 8 is a fragmentary detail section of a portion of my mechanism which is mounted upon the dashboard of the vehicle. Fig. 9 is a detail vertical section taken upon the line *d—d* of Fig. 1.

Referring now more particularly to the drawings, wherein like reference characters designate similar parts in all the figures, the numeral 1 denotes the body of an automobile, 2 the hood thereof, 3 the dashboard, and 4 the lamps. Within each lamp some source of light is provided, in this instance a gas burner 5 being shown. The rear wall of each lamp is formed by a reflecting member 6, and has connection with the body of the lamp through two members 7 and 8 having a diameter somewhat greater than that of the lamp itself. The peripheries of the members 7 and 8 are formed with flanges 9 which have a screw threaded engagement one with the other. An annular flange 10 formed upon the member 8 enters into screw threaded engagement with the body of the lamp, and a similar flange 11 formed upon the member 7 has screw threaded engagement with the rear portion 6 of the lamp. Between the members 7 and 8, and contiguous with the latter, there is mounted a circular plate 13 interiorly fitting the flange 9 of the plate 7, and free to undergo a limited rotation relative to the other portions of the lamp. Said plate 13 is formed with a central circular orifice 14 flush with the interior wall of the lamp. The flange 9 of the plate 7 is formed with a slot in its bottom portion as indicated at 15 (see Fig. 6) through which a short arm 16 projects integrally downward from the plate 13. The function of said arm and said slot is hereinafter made clear. Between the plate 13 and the member 8, there are mounted two similar coacting shutters 17 and 18, which are respectively pivotally mounted upon the plate 13 at vertically alined points 19 and 19ª, which points lie just above and below the orifice 14. Furthermore, a pivotal connection is established between the plate 13 and each shutter by a pin 20, passing through a short radial slot 21 formed in said plate, the pins 20 being diametrically opposed relative to the correlated plate 13. The head of the pin 19 by which the shutter 17 is pivotally mounted upon the member 8 constitutes a stop to limit the closing motion of the shutter 18, a shoulder 22 being formed upon said shutter to have contact with said stop. Similarly the head of the pin 19ª constitutes a stop limiting the motion of the shutter 17 as the latter reaches its closed position, said shutter being formed with a shoulder 22 exactly corresponding to that provided to the other shutter.

Each shutter is formed with one arcuate edge 22ª which when the shutter is in its open position has contact with the interior surface of the lamp. Another arcuate edge 22ᵇ of each shutter extends to a semi-circle of radius equal to the orifice 14, with which said edge is alined when the shutter is in its open position. A coiled spring 23 extending from the arm 16 to a pin 24 mounted exteriorly upon the lamp therebeneath, tends to maintain the plate 13 and shutters 17 and 18 in positions such as to leave the orifice 14 unobstructed, so that the light from the burner may be freely reflected at 6. Each downwardly projecting arm 16 is pivotally engaged by one arm of a bell crank 24ᵃ, which is pivoted at its apex upon a bracket 25 projecting rigidly downward from the correlated lamp. From the other arm of each bell crank 24ᵃ, a cord 26 extends rearwardly to the dashboard 3, and there makes a quarter turn toward the center of the vehicle over a pulley 27 mounted upon the dashboard within one side of the hood. From the pulleys 27, the two cords 26 are extended toward each other into the hood, and after passing under pulleys 28, said cords extend convergently upward to connect with a cord 29. The cord 29 makes an approximate quarter turn over a pulley 30 mounted upon a bracket 31 projecting from the top portion of the dashboard. Extending slightly forward from the pulley 30, said cord is attached to the front end of a slide bar 32, which passes transversely through the dashboard, a bushing 32ᵃ being inserted in the dashboard to receive said bar. A hand grip 33 is mounted fast upon the member 32 at the rear of the dashboard, adapting it to be manually displaced from its normal position shown in dash lines in Fig. 8 to the temporary position shown in full lines. The springs 23 will transmit a pull through the cords 26 and 29 to normally maintain the push bar 32 in its normal position. In order that the member 32 after having been displaced to its rearmost position may be retained in said position by mechanical means, a latch member 35 is mounted upon the rear portion of said member, its rear ends being hinged as indicated at 36 within a recess 34 in the pull rod. A small coiled spring 37 interposed between the free end of the latch member and the member 32 tends to maintain the latch member slightly displaced from the recess 34 at its free end as indicated in Fig. 8. A button 38 projecting upwardly from the latch member adapts the latter to be displaced into the recess 34 when it is desired to shift the member 32 to its forward limiting position. As long as the latch member is permitted to project from the recess 34, the free end of said member abuts against the dashboard and thus maintains the member 32 in its rearmost position.

From the preceding description, the operation of my shutter controlling mechanism is apparent. As long as the spring 23 is permitted to maintain the plate 13 in its normal position (illustrated in Fig. 6), the shutter members 17 and 18 occupy positions contiguous with the interior surface of the lamp, in which position they interpose no obstacle to the light impinging through the orifice 14 upon the reflector 6. When through a pull exerted upon the member 32, the plate 13 is displaced to the position illustrated in Fig. 5, the shutter members 17 and 18 are swung about their respective pivots 19 and 19ᵃ, reaching the positions shown in Fig. 5 in which they completely shut off the reflector 6 from the burner. When the shutters are thus adjusted in their closed positions, the lamps will emit a very soft light as compared to the glare produced when the reflectors of the lamps are in use.

The invention is presented as including all such modifications and changes as properly come within the scope of the following claim.

What I claim is:

In a device of the character described, a vehicle lamp having a detachable reflector forming its rear wall, two members of relatively larger diameter than the body of the lamp and screw threaded to each other, one of said members being in screw threaded engagement with the reflector and the other in screw threaded engagement with the body of said lamp, two coacting shutters pivoted within the two members, a short arm projecting from one shutter, a spring connected at one end to said arm and controlling the normal open position of the two shutters and means for operating said arm against the tension of the spring.

In testimony whereof I have signed my name to this specification in the presence of two subscribing witnesses.

PAUL LATTA.

Witnesses:
 R. E. C. BRUCKNER,
 C. A. ELLIS.